United States Patent Office 3,318,963
Patented May 9, 1967

3,318,963
PREPARATION OF FLUOROCARBONS
Geoffrey Pass, Northwich, England, assignor to Imperial Chemical Industries Limited, London, England, a corporation of Great Britain
No Drawing. Filed June 1, 1964, Ser. No. 371,772
Claims priority, application Great Britain, June 24, 1963, 25,033/63
5 Claims. (Cl. 260—651)

This invention relates to a method of making fluorocarbons by removing chlorine atoms from aliphatic or aromatic chlorofluorocarbons and replacing them with perfluoroalkyl radicals particularly with the perfluoromethyl radical $CF_3$.

According to the general embodiment of our invention we provide a process for making fluorocarbons comprising heating an aliphatic or aromatic chlorofluorocarbon with an aliphatic fluorohydrocarbon.

In a particular embodiment of the invention we provide a process for making fluorocarbons comprising heating an aliphatic or aromatic chlorofluorocarbon with fluoroform $CF_3H$.

The course of the general reaction may be represented by the equation $$RCl + R_1H \rightarrow R-R_1 + HCl$$

wherein R represents a perfluoroaliphatic or aromatic radical, and $R_1$ represents a perfluoroalkyl radical, whilst the particular embodiment of the invention can be represented by the equation $$RCl + CF_3H \rightarrow R-CF_3 + HCl$$

where R has the same meaning as before.

The temperature at which the reaction is carried out above 500° C. and preferably from 600° to 850° C. The choice of reaction temperature is much influenced by the thermal stability of the possible reaction products.

It is convenient to carry out the reaction in a flow-type reactor, for example a nickel tube having a small internal diameter of the order of 2 to 8 mms., and to pass the reactants at such a rate that their residence time is less than one minute.

Examples of chlorofluorocarbons that can undergo the reaction are trifluorochloroethylene, trifluorochloromethane, pentafluorochlorobenzene, which with fluoroform yield respectively hexafluoropropene, perfluoroethane and perfluorotoluene.

The invention is illustrated by the following examples.

Example 1

Fluoroform and trifluorochloroethylene were passed in equimolar proportions through a nickel tube 25 cms. long and 3.0 mms. inside diameter heated to 700° C. at a rate of 0.50 litre per hour. The product accumulated after one hour was analysed by means of gas-liquid chromatography, using dibutyl phthalate and an inert support, and infra-red spectroscopy and shown to contain approximately 20% of fluoroform, 20% of trifluorochloroethylene and 22% hexafluoropropene by weight. The reaction is represented by the equation $$CF_3H + CF_2=CFCl \rightarrow CF_2=CF \cdot CF_3 + HCl$$

Example 2

Fluoroform at a rate of 0.50 litre per hour and pentafluorochlorobenzene at a rate of 0.34 litre per hour (of the vapour) were passed together through a nickel tube 25 cms. long and 3.0 mms. inside diameter heated to 750° C. The average residence time of the gaseous mixture in the tube was about 22 seconds. The gaseous products contained hydrogen chloride, and the liquid product (6.8 g.) collected over 2 hours was found to contain 2.0 g. of perfluorotoluene. The reaction is represented by the equation $$CF_3H + C_6F_5Cl \rightarrow C_6F_5 \cdot CF_3 + HCl$$

What I claim is:
1. A process for making fluorocarbons comprising reacting at a temperature above 500° C. a chlorofluorocarbon chosen from the group consisting of aliphatic monochlorofluorocarbons containing 1 to 2 carbon atoms per molecule and pentafluorochlorobenzene with fluoroform.
2. A process as claimed in claim 1 in which the reaction temperature is from 600° C. to 850° C.
3. A process as claimed in claim 2 in which the reactants are in contact for less than one minute.
4. A process for making hexafluoropropene comprising reacting trifluorochloroethylene with fluoroform at a temperature of 600° C. to 850° C. with a contact time of less than one minute and separating hexafluoropropene from the reaction products.
5. A process for making perfluorotoluene comprising reacting pentafluorochlorobenzene with fluoroform at a temperature of 600° C. to 850° C. with a contact time of less than one minute and separating perfluorotoluene from the reaction products.

No references cited.

LEON ZITVER, Primary Examiner.

N. J. KING, JR., H. T. MARS, Assistant Examiners.